(No Model.)
D. L. McQUARRIE & H. W. BROWN.
ROLLING SUPPORT FOR CAR BODIES.
No. 551,907. Patented Dec. 24, 1895.
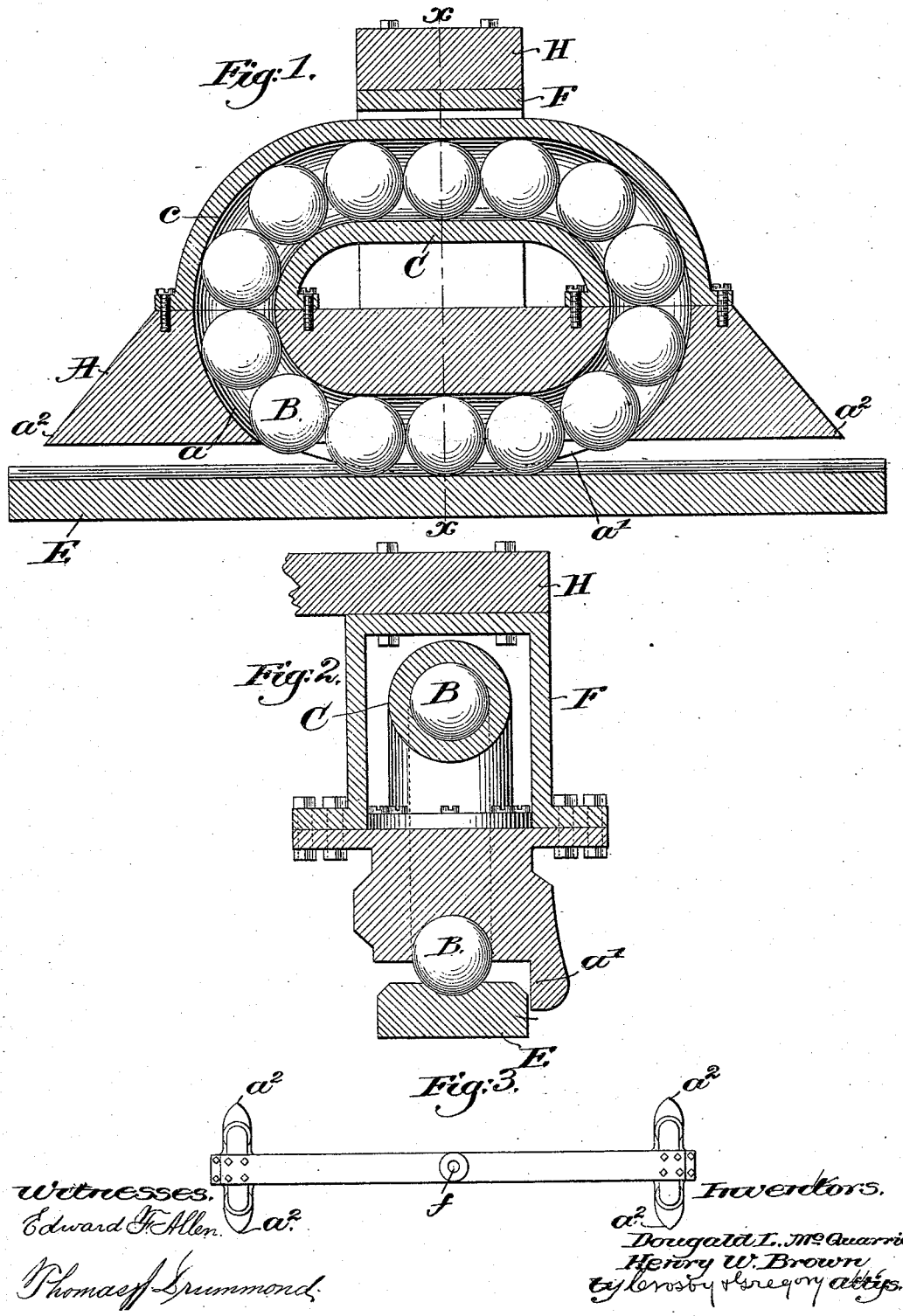

UNITED STATES PATENT OFFICE.

DOUGALD L. McQUARRIE AND HENRY W. BROWN, OF GLOUCESTER, MASSACHUSETTS.

ROLLING SUPPORT FOR CAR-BODIES.

SPECIFICATION forming part of Letters Patent No. 551,907, dated December 24, 1895.

Application filed October 15, 1894. Serial No. 525,950. (No model.)

*To all whom it may concern:*

Be it known that we, DOUGALD L. MCQUARRIE and HENRY W. BROWN, of Gloucester, in the county of Essex, State of Massachusetts, have invented an Improvement in Rolling Supports for Car-Bodies and the Like, of which the following description, in connection with the accompanying drawings, is a specification, like letters on the drawings representing like parts.

This invention has for its object to provide an improved rolling support or truck for supporting car-bodies in use upon railways and the like.

Our improvement consists in substituting for wheels usually employed one or more series of rolling balls or rolls, upon which the weight is sustained and rolls without friction.

In the preferred embodiment of our invention we provide each support with an endless conduit filled with balls which sustain the support and the weight thereupon and in their rolling movement travel around or through this endless conduit, as will more fully hereinafter appear.

In the drawings, Figure 1 represents in vertical longitudinal section one embodiment of our invention; Fig. 2, a vertical cross-section on the dotted line $xx$; and Fig. 3, a detail on a smaller scale, illustrating one manner of connecting two supports to form a truck.

In the particular construction shown in the drawings and selected to illustrate our invention, A is a body of suitable shape and construction, preferably of metal of suitable sort and proper strength, the same being provided with a U-shaped conduit $a$, having its ends at the top of the body and at the under side, the latter being open to permit several of the balls B contained within the conduit to protrude through the under face of the said body. Upon the top of this body A we have in the preferred construction arranged a U-shaped tube or pipe C, the interior of which constitutes a conduit $c$, which forms a continuation of and unites the ends of the conduit $a$, the two together forming an endless conduit filled with balls B, which latter are free to roll around through the conduit as necessary.

E is the rail, preferably grooved, as shown in Fig. 2, to receive the balls upon the support A, which latter is preferably provided at the inner side of the rail with a depending flange $a'$, to assist in retaining the support in proper running position upon the rail.

F is a yoke, (shown as arranged at the middle of the length of the support A and straddling the tube C,) and upon this yoke F may be secured in suitable manner one end of a bolster H, joining two supports at opposite sides of the track, as illustrated in Fig. 3, the car-body being suitably supported upon this bolster, it may be, by a usual transom-bolt $f$.

The balls B are in no wise confined, they being free to roll along in the conduit referred to, so that a weight carried upon the support and moved bodily forward will cause the said support to roll upon the tops of the balls in contact with the rail without friction, this rolling causing the balls to travel longitudinally along the conduit, the balls being successively rolled into position sustaining the support for a short time, and thereafter again entering the conduit to pass along through the same again to the front of the support.

In lieu of the balls shown cylindrical rolls might be employed, the construction being otherwise the same except that the rolls would require square or rectangular conduits rather than conduits circular in cross-section.

The body A is preferably pointed at its opposite ends, as illustrated at $a^2$, and is kept as close to the rail as possible to throw off any obstructions which may chance to fall upon the rail.

Our invention is not limited to the particular embodiment of the same herein shown and described, for it is evident our said invention may be varied in many particulars and still come within the spirit and scope of the same as set forth in the claims.

Having described one embodiment of our invention, and without limiting ourselves as to details, what we claim as new, and desire to secure by Letters Patent, is—

1. The combination with a body containing a conduit, as $a$, a pipe as C connecting the ends of said conduit $a$ and removable therefrom at said ends, to form a continuous endless conduit, combined with a series of balls substantially filling the said conduit, and free to roll therein, substantially as described.

2. The herein described truck consisting of two separated supports, each provided with an endless conduit, the upper portion thereof being removable, and a series of balls therein, combined with a connecting bolster rigidly secured to said supports independently of said removable portions, the arrangement being such that the said balls may be removed without disturbing said truck, substantially as described.

3. The herein described support, containing an elongated solid body portion, an arched top portion removably secured thereto at either end, said two portions having an endless conduit formed longitudinally therein, and a yoke arched over said removable portion and secured to said body portion at either side thereof, all arranged substantially as described.

In testimony whereof we have signed our names to this specification in the presence of two subscribing witnesses.

DOUGALD L. McQUARRIE.
HENRY W. BROWN.

Witnesses:
CYRUS STORY,
FRANZ E. SMOTHEN.